Patented Oct. 29, 1940

2,219,847

UNITED STATES PATENT OFFICE 2,219,847

PYRIDINE COMPOSITION FOR TREATMENT OF BLUE MOLD IN PLANTS AND SEED BEDS

Preston P. Purdum, Danville, Va.

No Drawing. Application August 11, 1938,
Serial No. 224,400

3 Claims. (Cl. 167—33)

This invention relates to a fungicidal composition for the control of blue mold particularly as affecting tobacco plants.

It is known that blue mold commonly attacks the small plants in the seed bed, and almost invariably the source of infection is in the soil of the seed bed, and that in general the infection of plants in the field has its inception in the seed bed.

A fungicidal treatment for blue mold must therefore, to be effective, be adapted not only to the treatment of the plants in the field, but also plants in the seed bed and particularly the soil of the seed bed.

One of the objects of the invention is to provide a treatment in which the soil is penetrated by a wetting solution of a fungicidal chemical compound which evolves a vapor deadly to blue mold and which vapor not only thoroughly permeates the soil to an effective depth, but also forms a gas impregnated stratum of air above the soil of the seed bed and in contact therewith, which inundates the small plants so that no particle of the surface of said plants escapes being contacted by the fungicidal vapor.

The thoroughness of the treatment is more fully ensured by the method of application of the fungicide, which is in the form of an aqueous dilution and is sprinkled or sprayed upon the plants themselves and then quickly washed off of the plants and into the soil beneath, thus contacting both the plants and the soil.

The invention specifically provides for the use of pyridine as the fungicide compound, pyridine being a compound soluble in water and which volatilizes readily.

One of the objects of the invention is to provide a compound with pyridine, including a substance which rapidly absorbs the evolved pyridine vapor and gives it off more slowly by diffusion, thereby prolonging the effect of the pyridine upon the tobacco plants and the soil of the seed bed.

Inasmuch as the metabolic processes of the plant appear to be interrupted while the plants are under the influence of the pyridine vapor, it is an object of the invention to include a plant stimulant in the plant composition to off-set the depressant effect of the pyridine.

The fungicidal composition of the present invention therefore comprises pyridine, an absorbent for pyridine vapor, and a plant stimulant. The absorber may be charcoal or its equivalent, and the plant stimulant may be a water soluble nutrient compound such as ammonium sulphate.

An example of the formula of my fungicidal composition including the optimum proportions of the several ingredients is:

| | Ounces |
|---|---|
| Pyridine | ½ |
| Powdered charcoal | 3½ |
| Ammonium sulphate | 12 |

This mixture therefore comprises about 3.2% pyridine and about 20.8% powdered charcoal. Thus the pyridine is present in proportion to the charcoal in the ratio approximately of 1 to 7 which is about 12% pyridine with respect to the pyridine and charcoal proportions. This mixture is put into two gallons of water to form a stock solution or concentrate. The pyridine and the ammonium sulphate dissolve in the water and the charcoal forms a suspension in the water. For use, the above solution is diluted in 10 gallons of water.

In this diluted form the fungicidal composition is sprinkled or sprayed upon the plants. This brings the pyridine solution directly against the foliage and the evolved pyridine vapor kills the fungus with which the plant itself may be affected. Immediately after its application to the plants, the solution is then thoroughly washed off of the foliage upon the ground beneath. Dissolved pyridine and ammonium sulphate filters into the ground while the charcoal, being insoluble, remains at or near the surface As the pyridine vapor is given off, it is absorbed by the charcoal which then more slowly gives it up to the atmosphere by diffusion prolonging the persistence of the fungicidal stratum of pyridine vapor and air about the young plants and in contact with the surface of the seed bed. The ammonium sulphate being water soluble, is immediately available to be taken up by the plant rootlets and assimilated, overcoming the injurious effects of the pyridine upon the young plants.

It is of course to be understood that the composition of the present invention is designed to be employed in the inhibition or destruction of blue mold in plants generally and under all conditions in which blue mold may be encountered.

It will be further understood that the proportions as given in the above exemplary formula are not critical, but may be varied within considerable limits without vitiating the value of the formula as an effective fungicide in the treatment of blue mold.

What I claim is:

1. Fungicidal composition for the treatment of blue mold in plants and the soil supporting said plants comprising pyridine, which volatilizes readily under atmospheric conditions, powdered charcoal which absorbs the pyridine vapor and gives off said vapor relatively slowly by diffusion, the composition containing sufficient pyridine to be in liquid form.

2. A fungicidal composition comprising pyridine intermixed with powdered charcoal, the composition containing sufficient pyridine to be in liquid form.

3. A fungicidal composition comprising pyridine intermixed with powdered charcoal in proportions of pyridine to charcoal of about 1 to 7, the composition being in liquid form.

PRESTON P. PURDUM.